UNITED STATES PATENT OFFICE.

MORDUCH L. KAPLAN, OF BROOKLYN, NEW YORK.

GALVANIC CELL.

1,293,462.  Specification of Letters Patent.  Patented Feb. 4, 1919.

No Drawing.  Application filed July 11, 1918.  Serial No. 244,439.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

The object of the present invention is to provide an economic method of preparing a highly efficient depolarizer for the galvanic cell of the Le Clanche type, especially for those of the miniature kind, lately come into use in portable lights and pocket lamps. In these kinds of lamps a compact high grade battery capable of yielding steady current is essential, and since steadiness of current is hardly attainable when powdered pyrolusite is used as a depolarizer, its use has been given up, and in its stead, artificial products such as hydrated manganese peroxid have been introduced. These products contain from 70 to 80 per cent. of $MnO_2$ and besides bulkiness have the great disadvantage of being exceedingly costly. This is due to the fact that their use is only possible when entirely free from basic or acid impurities, otherwise local actions sets in making cells containing the same of no practical value. Local action due to the presence of basic impurities is the reason why cheap artificial products such as, Weldon mud and others known as "recovered manganese" have been found unsuitable for battery manufacture. For the purpose of removing impurities, it has been attempted to treat these substances with dilute acids such as $H_2SO_4$ or HCl, but, though the resulting products have shown some shelf-standing qualities especially after careful washing and dehydration, these processes have not been generally adopted for several reasons.

Firstly, these treatments greatly impair the efficiency of the product as a depolarizer; the resulting product, due to losses in oxygen during drying and dehydration, being not very high in $MnO_2$.

Secondly, the treatment with acid removes not only injurious impurities but also considerable quantities of MnO, thus reducing the yields of manganese product considerably.

I have discovered a process free from the above objections, capable of yielding a high grade manganese peroxid highly efficient as a depolarizer and is applicable to all manganese peroxid compounds containing basic impurities or constituents, especially to such compounds known as "recovered manganese."

It consists in mixing these compounds with sufficient quantities of nitric acid so as to bind all basic substances present, including MnO, to the acid. Care should be taken to apply enough liquid to convert the powdery substances into an even damp mass. In those cases where only a small amount of acid is required, water may be added so as to insure the equal distribution of and penetration by the acid. The damp mass thus obtained is placed in an acid-resisting retort or chamber with facilities for heating, is heated to drive off water and the excess of acid and the temperature is then gradually raised to decompose the manganese nitrate formed previously. As the decomposition point of nearly all nitrates lies much higher than that of manganese nitrate, all acid-soluble impurities contained originally in the material are now present in the form of soluble nitrates which are easily removed by extraction with water.

The resulting product, after filtering, and drying at low temperatures, consists of a fine, dense, gray-colored powder resembling most closely in appearance the powdered mineral but is far superior to the latter in purity and efficiency. These products after having been incorporated with sufficient quantities of conducting material, such as graphite, have been found to possess exceedingly high depolarizing powers.

I have found also that in many cases it is preferable to introduce the conducting material before the acid treatment. This way of working affords the advantage of making possible through the presence of a conductor a more even heating of the mass avoiding local over-heating of the material at any point.

What I claim as my invention and desire to secure by Letters-Patent, is:

1. A method of preparing an electrode material for galvanic cells comprising the incorporation with a manganese peroxid compound of a conducting material, moistening the powdery mass with a liquid containing sufficient nitric acid to bind the basic substances present to the acid, heating the resultant damp powder to drive off moisture and excess of acid, then increasing the temperature to decompose the manganese nitrate formed, extracting the residual nitrates with water, and then filtering and drying the material.

2. A method of preparing an electrode material for galvanic cells comprising the incorporation with a manganese peroxid compound of sufficient nitric acid to bind the basic substances present, including MnO, to the acid, decomposing the manganese nitrate formed, and removing the residual nitrates, a conducting material being added to the compound at any convenient stage.

3. A method of preparing an electrode material for galvanic cells comprising the incorporation with a manganese peroxid compound of a conducting material, adding to this product sufficient nitric acid to bind the basic substances present, including MnO, to the acid, decomposing the manganese nitrate formed, and removing the residual nitrates.

4. A method of preparing an electrode material for galvanic cells from a manganese peroxid compound, which consists in converting the basic substances present in the compound into nitrates, decomposing the manganese nitrate and removing the residual nitrates, a conducting material being added to the compound.

Signed at New York city, in the county of New York and State of New York, this 10th day of July, A. D. 1918.

MORDUCH L. KAPLAN.

Witnesses:
ARTHUR MARION,
CHAS. C. GILL.